US011992908B2

(12) United States Patent
Terpstra

(10) Patent No.: US 11,992,908 B2
(45) Date of Patent: May 28, 2024

(54) EXTRACTION APPARATUS

(71) Applicant: Envirochasing IP Holdings Pty Ltd, Forrestdale (AU)

(72) Inventor: Steven Terpstra, Forrestdale (AU)

(73) Assignee: ENVIROCHASING IP HOLDINGS PTY LTD, Forrestdale (AU)

( * ) Notice: Subject to any disclaimer, the term of this patent is extended or adjusted under 35 U.S.C. 154(b) by 1035 days.

(21) Appl. No.: 16/349,895

(22) PCT Filed: Nov. 15, 2017

(86) PCT No.: PCT/AU2017/051256
§ 371 (c)(1),
(2) Date: May 14, 2019

(87) PCT Pub. No.: WO2018/090086
PCT Pub. Date: May 24, 2018

(65) Prior Publication Data
US 2020/0061795 A1    Feb. 27, 2020

(30) Foreign Application Priority Data

Nov. 16, 2016   (AU) ................................ 2016904685

(51) Int. Cl.
*B23D 59/00*    (2006.01)
*B23Q 11/00*    (2006.01)
(Continued)

(52) U.S. Cl.
CPC ............ *B23Q 11/0046* (2013.01); *B25F 5/02* (2013.01); *B27G 19/04* (2013.01); *B23D 59/006* (2013.01);
(Continued)

(58) Field of Classification Search
CPC ......... Y10T 83/207; B25F 5/02; B27G 19/04; B27G 19/02; B23D 59/006; B23D 59/00;
(Continued)

(56) References Cited

U.S. PATENT DOCUMENTS 3,882,598 A * 5/1975 Earle .................... B23D 59/006
269/21
5,327,649 A    7/1994 Skinner
(Continued)

FOREIGN PATENT DOCUMENTS

DE    10 2004 035876 B3    12/2005
WO    2011/104538 A1    9/2011
WO    2018/084784 A1    5/2018

OTHER PUBLICATIONS

Extended European Search Report dated Jun. 9, 2020 for European Patent Application No. 17872490.2, 8 pages.
(Continued)

*Primary Examiner* — Phong H Nguyen
(74) *Attorney, Agent, or Firm* — MH2 TECHNOLOGY LAW GROUP, LLP

(57) ABSTRACT

An extraction apparatus (20) for a cutting machine (10). The extraction apparatus (20) comprises first and second portions (21, 22) rotatable one relative to the other for angular movement between two opposed positions. A slidable coupling (27) defines a fluid flow path (29) for fluid communication between the first and second portions (21, 22) during said angular movement between the two opposed positions, whereby fluid can flow from the interior (45) of
(Continued)

the first portion (21) into the second portion (22). The slidable coupling (27) comprises first and second coupling sections (61, 62) slidable one with respect to the other. The second coupling section (62) is hollow to define an open interior (63). The first coupling section (61) defines a duct (65) opening onto the interior (63) of the second coupling section (62), whereby the duct (65) and the interior (63) of the second coupling section (62) cooperate to define the fluid flow path (29).

17 Claims, 10 Drawing Sheets

(51) Int. Cl.
  *B25F 5/02* (2006.01)
  *B27G 19/04* (2006.01)
  *B23Q 11/10* (2006.01)
  *B28D 7/02* (2006.01)
  *B28D 7/04* (2006.01)
(52) U.S. Cl.
  CPC ............ *B23Q 11/1023* (2013.01); *B28D 7/02* (2013.01); *B28D 7/04* (2013.01); *Y10T 83/207* (2015.04)
(58) Field of Classification Search
  CPC ............ B23Q 11/0046; B23Q 11/1023; B23Q 11/0042; B28D 7/02; B28D 7/04; B28D 1/04; B24B 55/06; B24B 55/10; B24B 55/102; B24B 55/12; B24B 27/00
  USPC ............ 125/13.01; 451/451, 453, 456, 442; 30/388, 516
  See application file for complete search history.

(56) References Cited

U.S. PATENT DOCUMENTS

| | | | | |
|---|---|---|---|---|
| 5,537,748 | A | * | 7/1996 | Takahashi ......... B23Q 11/0046 83/100 |
| 6,916,236 | B2 | | 7/2005 | Terpstra |
| 7,526,866 | B2 | * | 5/2009 | Schnell ............... B23D 59/006 D8/66 |
| 2007/0093189 | A1 | * | 4/2007 | Gaul .................... B24B 55/052 451/451 |
| 2009/0215364 | A1 | * | 8/2009 | Sun ...................... B24B 55/102 451/178 |
| 2010/0269353 | A1 | | 10/2010 | Martin |
| 2014/0223748 | A1 | * | 8/2014 | Guth .................... B27G 19/04 30/391 |
| 2015/0367530 | A1 | | 12/2015 | Vikholm et al. |

OTHER PUBLICATIONS

International Search Report and Written Opinion dated Jan. 24, 2018 from International Application No. PCT/AU2017/051256 (Authorised officer, Shane Kilcullen), 11 pages.

\* cited by examiner

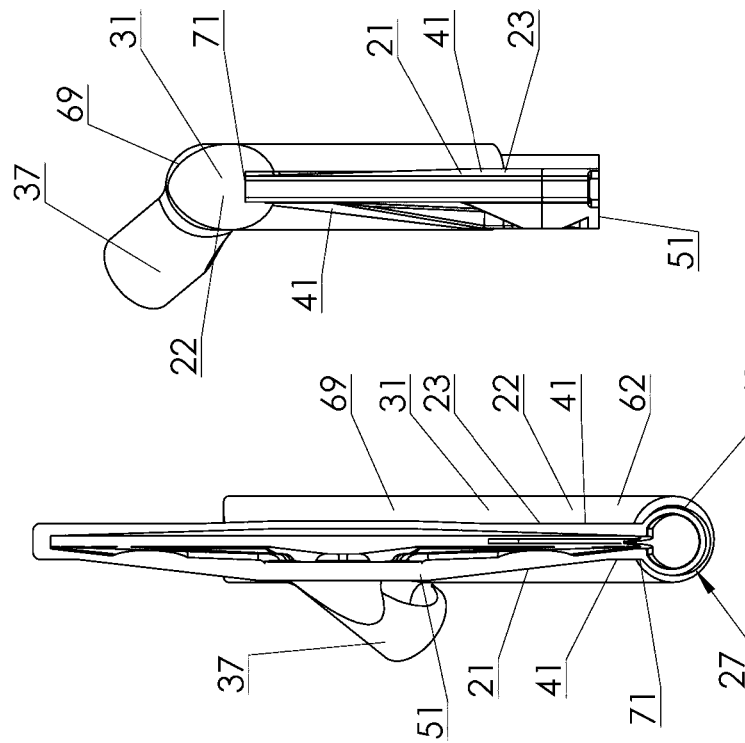
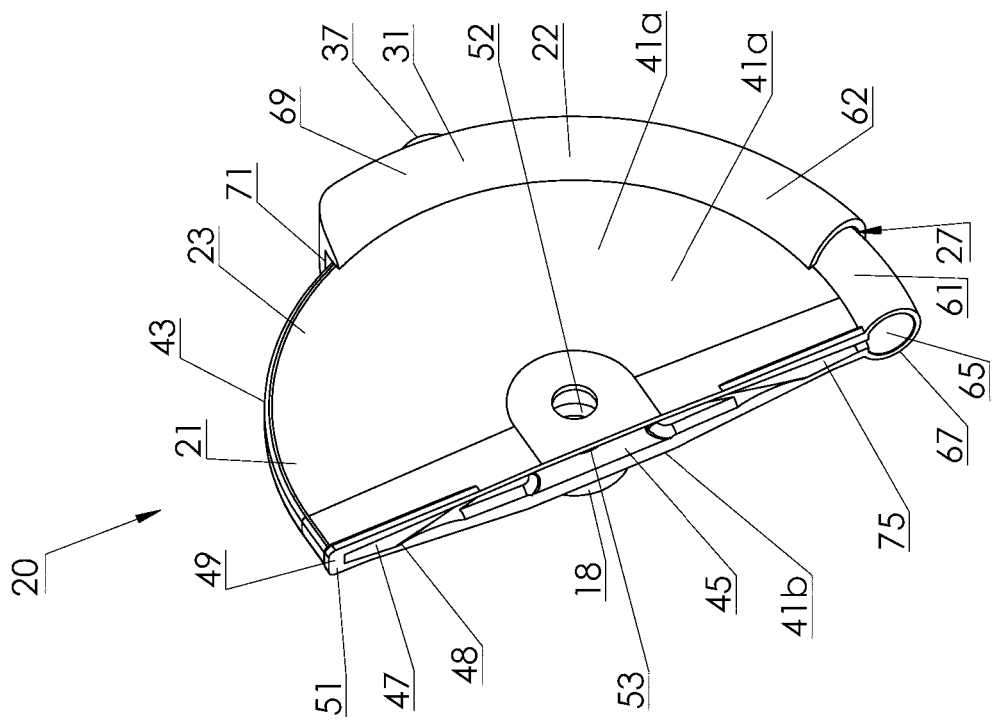

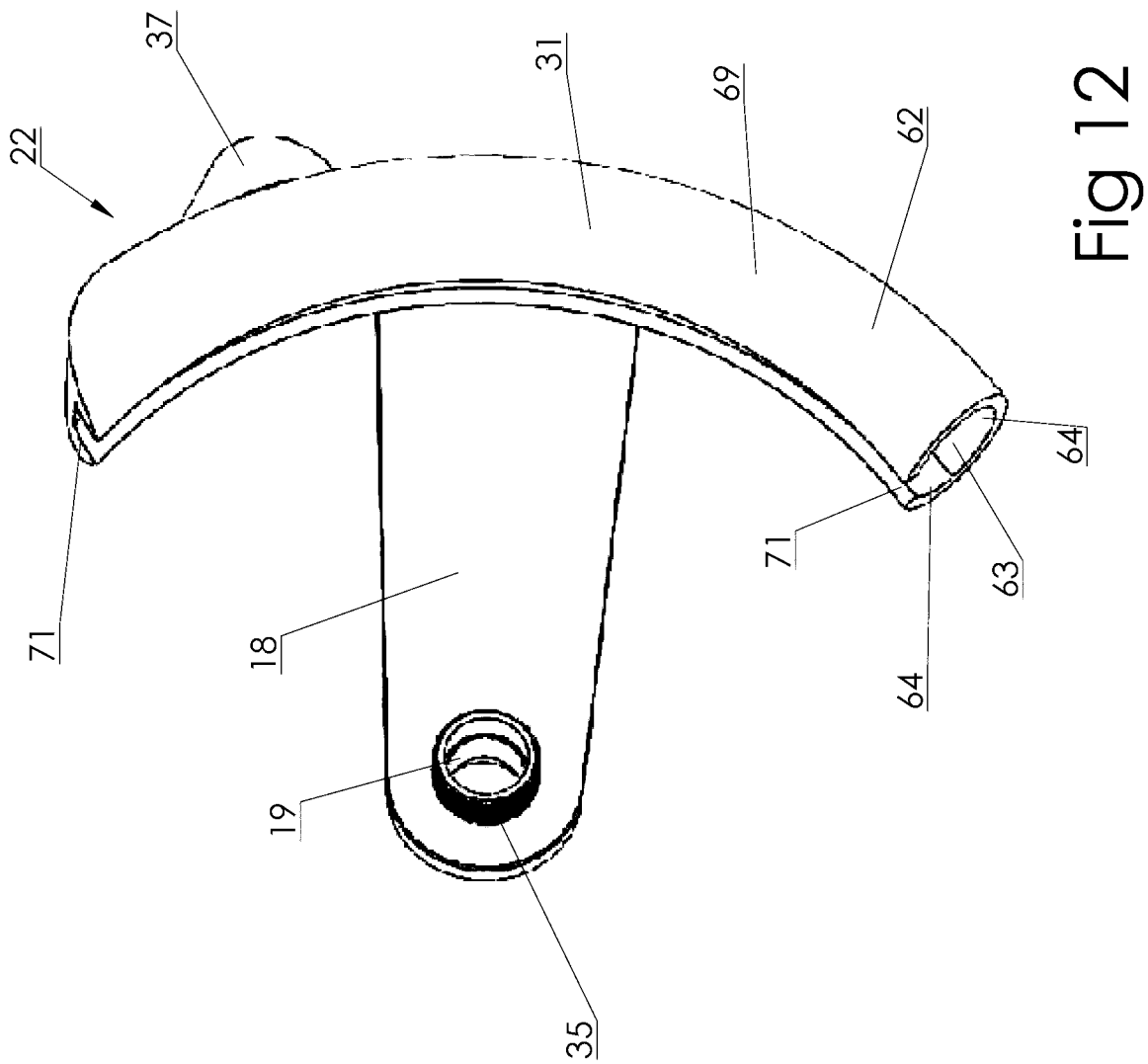

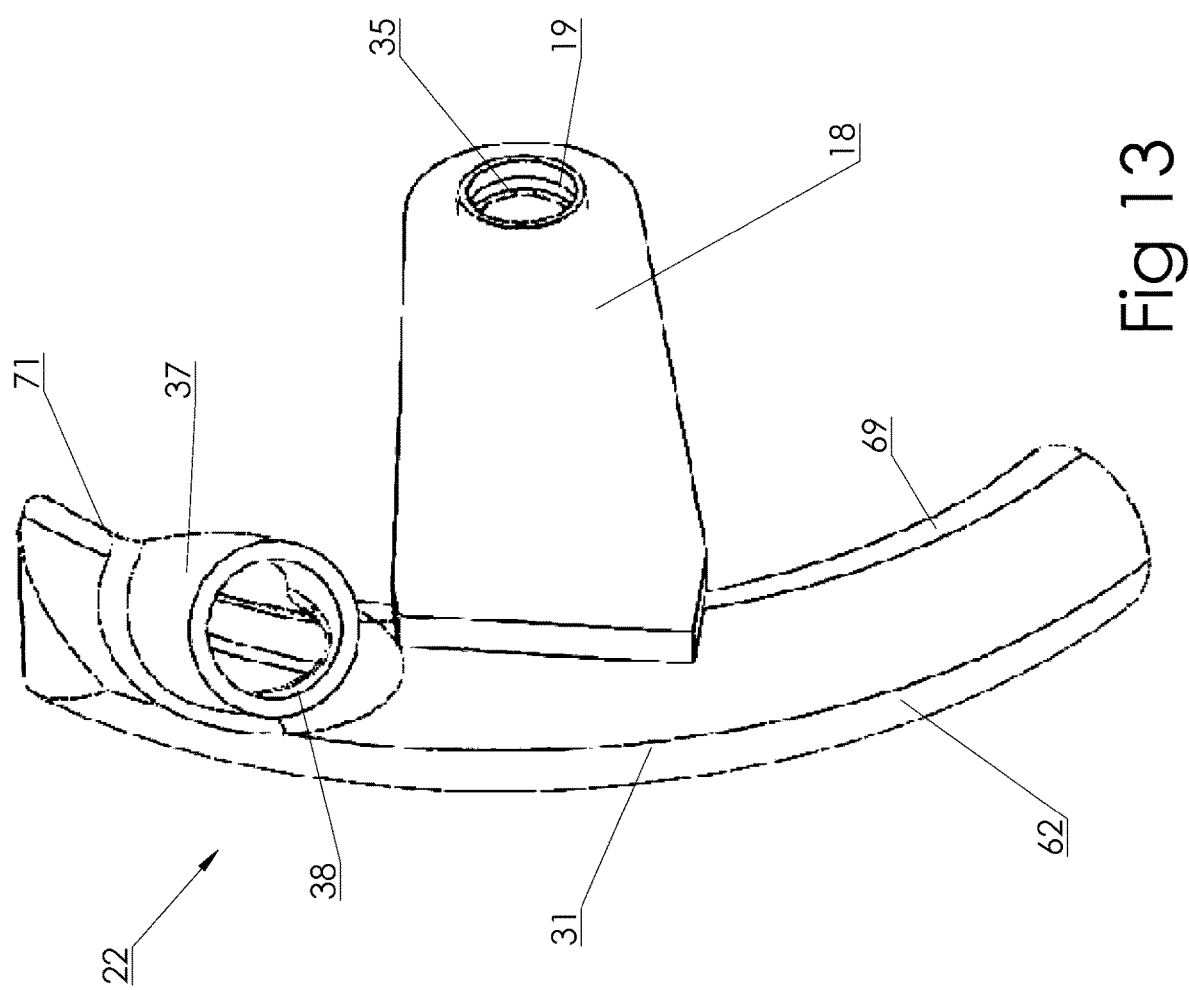

EXTRACTION APPARATUS

CROSS-REFERENCE TO RELATED APPLICATIONS

This application is a U.S. National Stage application of PCT/AU2017/051256 filed 15 Nov. 2017, which claims priority to Australian Application No. 2016904685 filed 16 Nov. 2016, the entire disclosures of which are hereby incorporated by reference in their entireties.

TECHNICAL FIELD

This invention relates to extraction apparatus and to a machine incorporating such apparatus.

BACKGROUND ART

The following discussion of the background art is intended to facilitate an understanding of the present invention only. The discussion is not an acknowledgement or admission that any of the material referred to is or was part of the common general knowledge as at the priority date of the application.

The invention has been devised particularly, although not necessarily solely, for use with a machine operable to perform working operations (such as cutting and chasing) in masonry surfaces such as brickwork and concrete surfaces. With such a machine, dust generated by the working operation is typically suppressed with a liquid, creating slurry. It is desirable that the slurry created during operation of the machine be controlled by being contained and collected, in order to maintain a clean and safe working environment.

The chasing or cutting operations are typically performed using a rotary tool element in the form of a circular blade, such as a diamond segmented blade, a saw blade or an abrasive disc. It is known to provide the machine with a shroud in which the circular blade is partially accommodated, thereby providing a safety guard around at least part of the blade and also an enclosure about part of the blade. The enclosure provided by the shroud serves to inhibit debris and slurry, which is created during operation of the machine and which is thrown tangentially from the rotating circular blade, from being flung outwardly about the worksite. While the shroud inhibits slurry being flung about the worksite, it does not necessarily contain the slurry, as the shroud has an open end through which the slurry can escape, spilling out of the shroud and spreading over the surface being cut and around the immediate vicinity of the worksite.

Typically, the machine is a hand held unit and the angular position of the machine can vary as it is moved with respect to the surface in which the cutting or chasing operation is being performed. In order to accommodate this variation in angular position, the shroud is typically mounted for swiveling movement on the machine, whereby the shroud can swivel to assume and maintain correct alignment with the surface.

In the present applicant's U.S. Pat. No. 6,916,236, there is a proposal to contain and collect the slurry from within the shroud, thereby inhibiting dispersion of the slurry over the surface being cut as well as about the immediate vicinity of the worksite The requirement for the shroud to swivel necessitates that there be some form of connection with the shroud which is configured to accommodate the swiveling movement as well as providing a path along which slurry contained by the shroud can be collected.

The approach adopted in U.S. Pat. No. 6,916,236 involves use a flexible tube section between the shroud and a suction line associated with the machine. The flexible tube section can accommodate the swiveling movement and provides a flow passage which opens onto the interior of the shroud to provide a path along which slurry can be drawn from the shroud by suction.

While such an approach has proved satisfactory in use, it does not necessarily provide a compact arrangement. In particular, the overall assembly which provides the shroud is required to swivel, and the flexile tube section is required to be connected to the shroud. The flexible tube section needs to be of sufficient length to provide a surplus portion for accommodating the full extent of potential swiveling movement of the shroud. As the shroud swivels, the surplus portion of the flexible tube section can flex and assume a curved configuration, occupying space adjacent the shroud, which can be generally inconvenient.

It is against this background that the present invention has been developed.

The present invention is not, however, limited to slurry control and may be applicable for control of dust and other debris (such as cuttings and residue materials) generated during a working operation, but without operating in conjunction with a dust suppression liquid.

SUMMARY OF INVENTION

According to a first aspect of the invention there is provided an extraction apparatus comprising first and second portions rotatable one relative to the other for angular movement between two opposed positions, the first portion defining an interior for receiving a portion of a rotary tool element, the first and second portions being configured for fluid communication during said angular movement between the two opposed positions whereby fluid can flow from the interior of the first portion into the second portion.

The fluid flow may comprise a fluid mixture. The fluid mixture may, for example, comprise ambient air induced into the interior of the first portion, and also dust and other debris generated through operation of the rotary tool element. In circumstances where the tool is operating in conjunction with a dust suppression liquid such as water, the fluid mixture may also comprise the dust suppression liquid. In such circumstances, the dust suppression liquid and dust and other debris generated through operation of the rotary tool element, may form a slurry which may comprise the fluid mixture. In such circumstances, the extraction apparatus may function as a slurry control guard for a machine driving the rotary tool element, whereby the apparatus is operable to contain and facilitate collection of slurry generated during operation of the machine and also provides a safety guard for the rotary tool element.

The second portion may be adapted for connection to a suction source to promote fluid flow from the first portion to the second portion.

The first and second portions may be configured to define a slidable coupling providing a fluid flow path, the slidable coupling being adapted to accommodate the angular movement between the first and second portions.

The slidable coupling may comprise a first coupling section and a second coupling section, the first and second coupling sections being slidable one with respect to the other. The second coupling section may be hollow to define an open interior, and the first coupling section may define a duct opening onto the interior of the second coupling section, whereby the duct and the interior of the second coupling section cooperate to define the fluid flow path.

The first coupling section may be slidably received within the second coupling section.

The first coupling section may be configured as a tubular section defining a flow duct. The second coupling section may be configured as a sleeve section. The tubular section may be slidably received in the sleeve section, whereby the slidable coupling is operable to undergo extension and contraction in a telescopic manner.

The first coupling section and the second coupling section may be configured to accommodate angular movement between the first and second portions. More particularly, the first coupling section and the second coupling section may each be curvilinear in length to accommodate angular movement between the first and second portions while sliding one with respect to the other.

The first coupling section may be provided on the first portion, and the second coupling section may be provided on the second portion.

The first coupling section may be provided at the outer periphery of the first section.

The first portion may comprise a peripheral wall bounding the interior of the first portion, and the first coupling section may be disposed adjacent a portion of the peripheral wall on the opposed side thereof with respect to the interior, the duct defined by the first coupling section being in fluid communication with the interior of the first portion through an intervening portion of the peripheral wall.

The sleeve section, which comprises the second coupling section, may be configured to accommodate angular movement of the first portion as the first coupling section moves slidably with respect to the second coupling section. For instance, the sleeve section may incorporate an axial opening such as a slot for accommodating the first portion during angular movement thereof as the tubular section defining the first coupling section moves slidably with respect to the sleeve section.

The portion of the peripheral wall adjacent which the first coupling section is disposed may comprise a section of the wall confronted by oncoming dust and other debris generated through operation of the rotary tool element (either directly or entrained within slurry).

The interior of the first portion may be in fluid communication with the flow path by way of one or more openings provided in the peripheral wall.

The one or more openings provided in the peripheral wall may comprise an aperture in the peripheral wall.

The aperture may be disposed adjacent an open end of the first portion through which the rotary tool element can extend. With this arrangement, fluid flow can be established to induce ambient air to flow into the interior of the first portion through the open end. The aperture may be contiguous with, and may extend inwardly from, the open end of the first portion.

The one or more opening may further comprise one or more ports in the peripheral wall. The port(s) may be configured to deflect or otherwise direct dust and other debris generated through operation of the rotary tool element, as well as any associated slurry, into the flow path within the sliding coupling. The port(s) may be disposed downstream of the aperture adjacent the open end of the first portion. With this arrangement, fluid flow along the duct from the aperture can flow passed the port(s).

The first portion may be configured as a shroud disposed about a portion of the rotary tool element, the shroud having an opening providing said opening through which the rotary tool element extends.

The shroud may be configured to confine dust and other debris generated through operation of the rotary tool element, as well as any associated slurry, within the interior of the first portion for subsequent extraction by way of said fluid flow from the interior of the first portion into the second portion.

The rotary tool element may comprise a circular blade, such as a toothed blade (e.g. a saw blade) or an abrasive disc.

The shroud may comprise two opposed side walls and said peripheral wall cooperating to define the interior of the first portion and also the open end of the first portion.

The two opposed side walls may disposed in close proximity to each other, whereby the interior of the first portion is configured to receive the rotary tool element when comprising a circular blade with the opposed side walls closely adjacent opposed sides of the circular blade. The peripheral wall may be arcuate to conform with and be located closely adjacent the periphery of the circular blade.

The first portion may be formed of any appropriate material, including in particular a plastics material of a type which is hard and has good impact resistance.

The second portion may be formed of any appropriate material, including in particular a plastics material of a type having resilient flexibility and good heat resistance.

The first and section portions may each be of one-piece construction, or alternatively either or both may comprise an assembly of parts.

The first and section portions, or parts thereof, may each be formed in any appropriate way; for example, by plastic moulding or additive manufacturing (such as 3D printing).

According to a second aspect of the invention there is provided an extraction apparatus comprising first and second portions rotatable one relative to the other for angular movement between two opposed positions, the first portion defining an interior for receiving a portion of a rotary tool element, a slidable coupling defining a fluid flow path for fluid communication between the first and second portions during said angular movement between the two opposed positions whereby fluid can flow from the interior of the first portion into the second portion, the slidable coupling comprising first and second coupling sections slidable one with respect to the other, the second coupling section being hollow to define an open interior, the first coupling section defining a duct opening onto the interior of the second coupling section, whereby the duct and the interior of the second coupling section cooperate to define the fluid flow path, and wherein the first coupling section and the second coupling section are each configured to accommodate angular movement between the first and second portions while sliding one with respect to the other.

According to a third aspect of the invention there is provided a machine for performing a working operation, the machine having an extraction apparatus according to the first or second aspect of the invention.

The machine may be operable for performing any appropriate working operation; for example, a chasing or cutting operation in a surface, such as wall or floor of a building.

The machine may be a hand-held unit (such as, for example, a hand-held chasing saw or a general purpose power cutter)), or a machine adapted to be supported on and moved over a surface (such as, for example, a floor saw). Where the machine is adapted to be supported on and moved over a surface, it may be propelled in any appropriate way, such as by hand propulsion via an operator or by powered propulsion via an associated power drive system.

According to a fourth aspect of the invention there is provided a method of performing a working operation, the method comprising use of a machine according to the third aspect of the invention.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which:

FIG. 6 is a perspective view of the extraction apparatus, with the shroud shown in a position corresponding generally to that of FIG. 1;

FIG. 10 is a schematic view of the first and second portions of the extraction apparatus, illustrating in particular one end of the slidable coupling;

FIG. 11 is a schematic view of the first and second portions of the extraction apparatus, illustrating in particular the other end of the slidable coupling;

FIG. 12 is a perspective view of a portion of the extraction apparatus, viewed from one side thereof;

FIG. 13 is a view similar to FIG. 12, except that it is viewed from the other side thereof;

Figure 1:
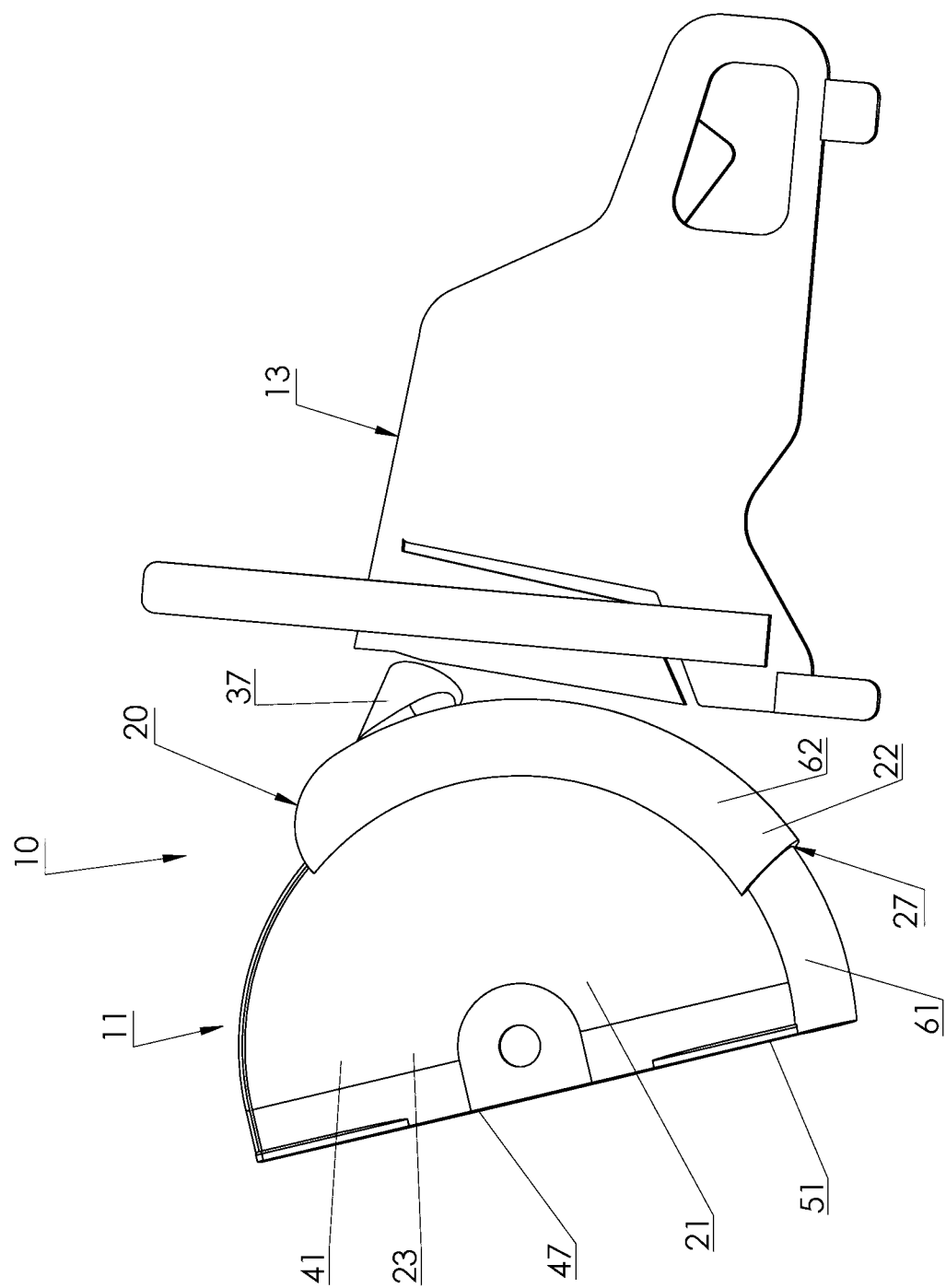
FIG. 1 is a side elevational view of a cutting machine fitted with an embodiment of an extraction apparatus according to the invention, with a shroud forming part of the extraction apparatus shown in one position.

The drawings shown are not necessarily to scale, with emphasis instead generally being placed upon illustrating the principles of the present invention.

The figures depict an embodiment of the invention. The embodiment illustrates a certain configuration; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

Referring to the drawings, there is shown a cutting machine 10 for performing a cutting or chasing operation on a wall or floor surface. In this embodiment, the cutting machine 10 is a hand-held unit, although other arrangements are contemplated such as machine adapted to be supported on and moved over a surface (for example, a floor saw).

The cutting machine 10 comprises a work head 11 and a body 13 supporting the work head. The body 13 incorporates a drive unit (not shown) which in this embodiment comprises an internal combustion engine (such as a petrol engine). The drive unit can, of course, comprise any other appropriate drive system, including for example an electric, hydraulic or pneumatic motor. The drive head 11 receives and supports a rotary tool element 17 (shown only in FIG. 13) which in this embodiment is in the form of a rotatable circular blade, such as for example a diamond segmented blade, a saw blade or an abrasive disc. The circular blade 17 is driven by the drive unit. More particularly, the circular blade 17 is removably mounted on a drive spindle (not shown) coupled to the drive unit in known manner. The work head 11 includes a support arm or bracket 18 for rotatably supporting the outer end section of the drive spindle (not shown) by way of a bearing 19, as best seen in FIG. 12.

During operation of the cutting machine 10, dust and debris (e.g. other particulates such as fragments) are typically generated, and there is a need to control the dust and debris. For this purpose, the cutting machine 10 has a facility to deliver a dust suppression liquid (such as water), with the result that a slurry is generated. There is a need to control the slurry, otherwise it may spill and spray about the worksite, and also accumulate at the worksite.

The cutting machine 10 is fitted with an extraction apparatus 20 control of the slurry. The extraction apparatus 20 is adapted to contain dust generated during operation of the cutting apparatus 10, as well as slurry formed from the dust, and to facilitate extraction of the slurry under the influence of suction derived from a suction source. The extracted slurry can be collected for treatment or disposal.

The extraction apparatus 20 comprises first and second portions 21, 22.

The first portion 21 is configured as a shroud 23 which is adapted to contain the dust and slurry as it is generated and from which the contained slurry can be collected, as will be explained in more detail later. The shroud 23 also provides a protective guard 25 for the rotatable circular blade 17.

While not shown in the drawings, the extraction apparatus 20 has provision for delivery of a dust suppression liquid (such as water) to the shroud 23. Such provision may take any appropriate form, including for example an arrangement similar to that disclosed in U.S. Pat. No. 6,916,236. The dust suppression liquid contacts dust and debris generated by the rotating action of the circular blade 17 to form a slurry. The dust suppression liquid (such as water) is typically delivered to the peripheral cutting edge of the circular blade 17 by inertia and centrifugal effects arising from the rotating action of the circular blade.

The first portion 21 is mounted for angular movement relative to the second portion 22, thereby permitting swiveling motion of the shroud 23 between two opposed positions, the purpose of which will be explained later.

The first and second portions 21, 22 are configured to define a slidable coupling 27 which provides a fluid flow path 29, whereby slurry can flow from the shroud 23 defined by the first portion 21 to the second portion 22 under the influence of suction applied to the fluid flow path 29. The slidable coupling 27 is adapted to accommodate angular movement between the first and second portions 21, 22.

In the arrangement shown, the first portion 21 comprising the shroud 23 is rotatably supported on the support arm or bracket 18. The support arm or bracket 18 incorporates a bush portion 35 adjacent the free end thereof, with the bush portion 35 being configured to rotatably support the shroud 23.

The second portion 22 is adapted to be attached to, or to be formed integrally with, the work head 11 of the cutting machine 10. The second portion 22 may be attached to the work head 11 in any appropriate way. In the arrangement shown, the second portion 22 is attached to the support arm or bracket 18 forming part of the work head 11.

The second portion 22 comprises a main body 31 of elongate configuration. The main body 31 incorporates a connector 37 such as a fitting which communicates with the flow path 29 and to which to which a suction line can be attached for applying suction to the flow path. The connector 37 thus provides an outlet end 38 of the flow path 29.

Figure 18:
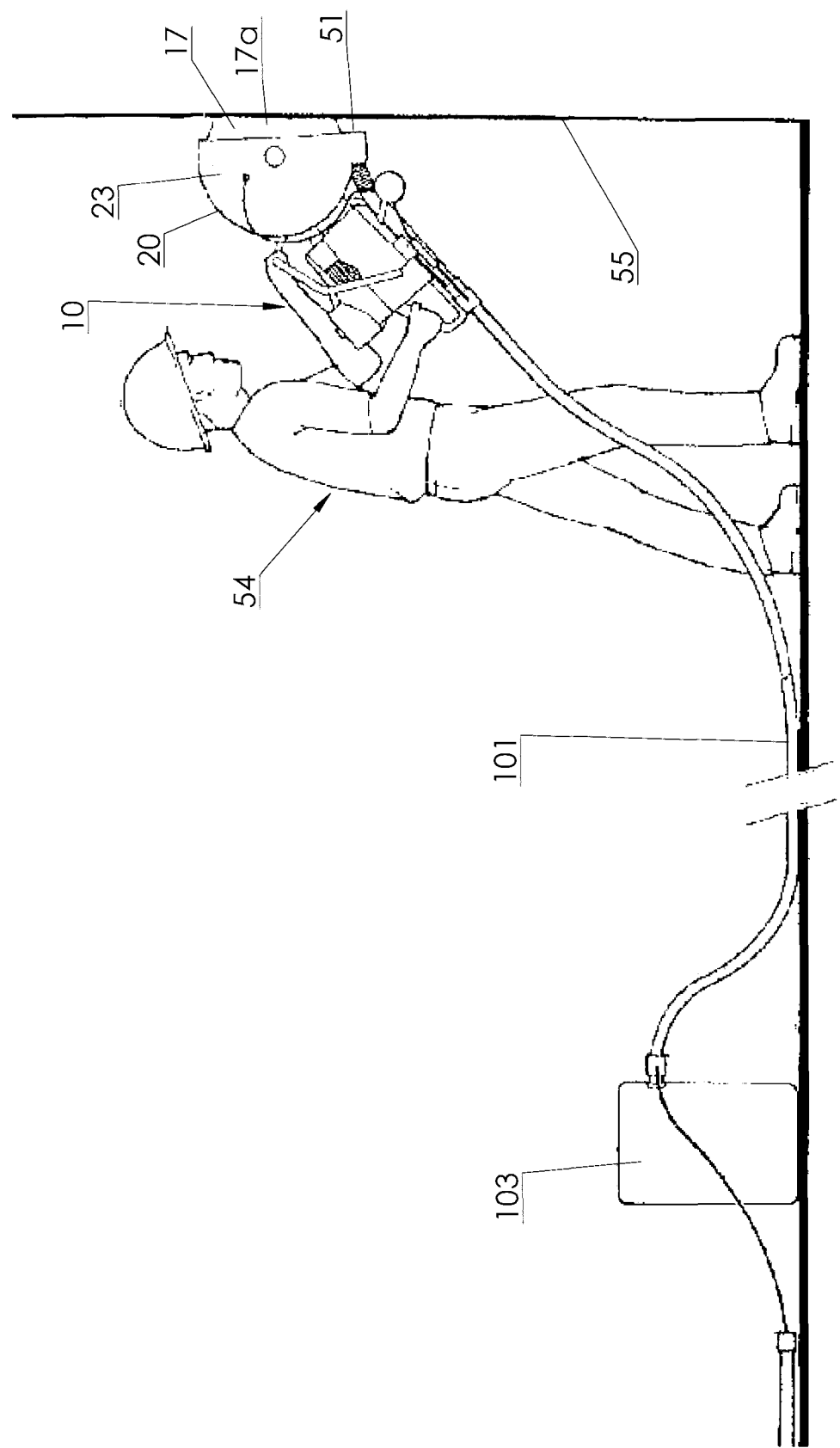
FIG. 18 is a schematic view illustrating the cutting machine in operation.

The shroud 23 comprises two opposed side walls 41 and a peripheral wall 43 which cooperate to define an interior 45 and an open end 47 defining an opening 48. The arrangement is such that the circular blade 17 mounted on the drive spindle of the cutting machine 10 is partially received within the interior 45 and extends outwardly through the opening 48 to provide an exposed blade portion 17a for performing the cutting or chasing operation, as shown in FIG. 18. The two opposed side walls 41 are disposed in close proximity to each other, whereby the interior 45 is configured to receive the circular blade 17 with the opposed side walls closely adjacent opposed sides of the circular blade. The peripheral wall 43 is arcuate to conform with, and be located closely adjacent to, the periphery of the circular blade 17. The open end 47 is disposed in opposed relation to the peripheral wall 43 and comprises a peripheral edge 49 which bounds the opening 48 and which defines a contact face 51 for engagement with a wall or floor surface in which a cutting or chasing operation is to be performed by the cutting machine 10.

One side wall 41a of the shroud 23 has an opening 52 through which the drive spindle of the cutting machine 10 can extend into the interior 45 of the shroud 23 to receive the rotatable cutting blade 17.

The other side wall 41b of the shroud 23 has an opening 53 which receives the bush portion 35 of the support arm or bracket 18, whereby the side wall 41b (and hence the shroud 23 itself) is rotatably supported on the support arm or bracket 18.

In operation of the cutting machine 10, as depicted schematically in FIG. 13 (by way of example only), an operator 54 controlling the cutting machine presents the rotating circular blade 17 to a surface 55 in which a cutting or chasing operation is to be performed, and the rotating circular blade 17 penetrates the surface 55 to an extent that the contact face 51 ultimately engages the surface 55. The operator 54 then moves the cutting machine 10 along the surface 55 to perform the cutting or chasing operation, with the contact face 51 remaining in engagement with, and sliding over, the surface 55. As the operator 54 progressively moves the cutting machine 10 along the surface 55, the orientation or angular position of the cutting machine can vary, which necessitates that the shroud 23 swivel (i.e. move angularly) with respect to the remainder of the cutting machine in order for the contact face 51 of the shroud to maintain in engagement with the surface 55 in which the cutting or chasing operation is being performed. It is important that the contact face 51 of the shroud 23 remain in engagement with the surface 55 as this controls the depth of cut and also establishes a form of seal at the interface between the surface 55 and the shroud to inhibit egress of dust and slurry at the interface. The swiveling motion (i.e. angular movement) of the shroud 23 is facilitated by the shroud 23 being rotatably supported on the support arm or bracket 18, as previously described.

Figure 2:
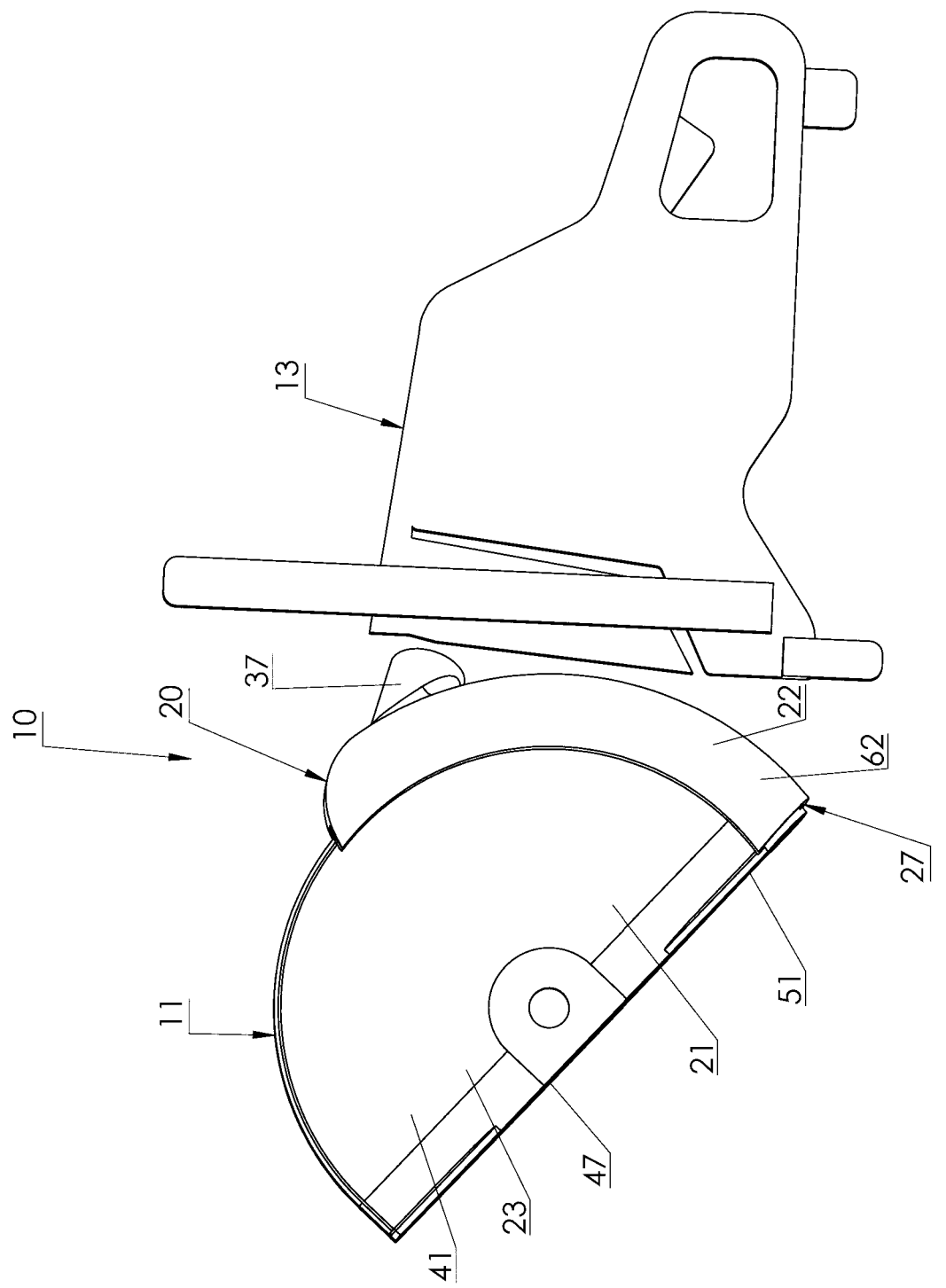
FIG. 2 is a view similar to FIG. 1, with the exception that the shroud is shown in another position.
Figure 3:
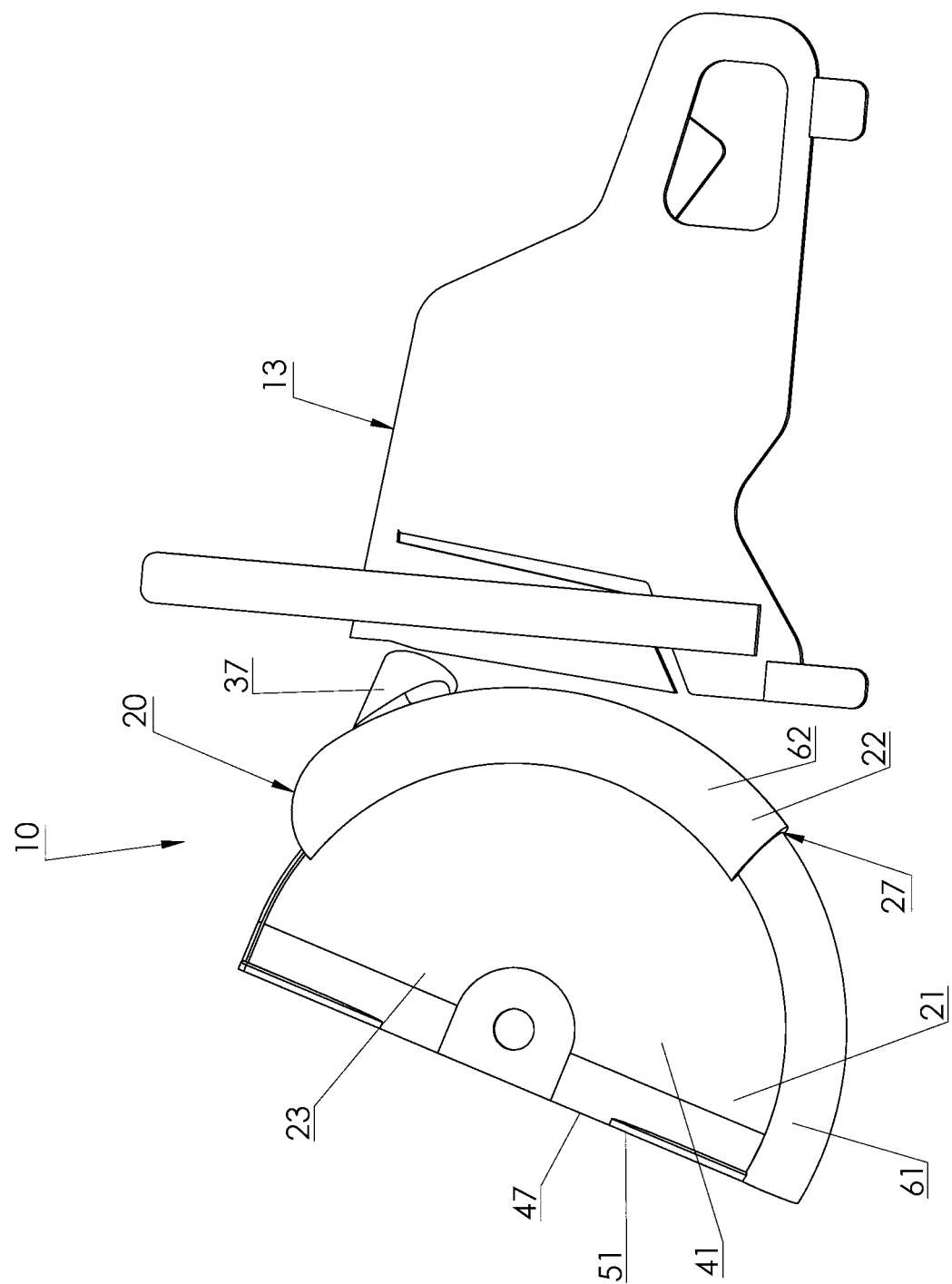
FIG. 3 is also a view similar to FIG. 1, with the exception that the shroud is shown in yet another position.
Figure 5:
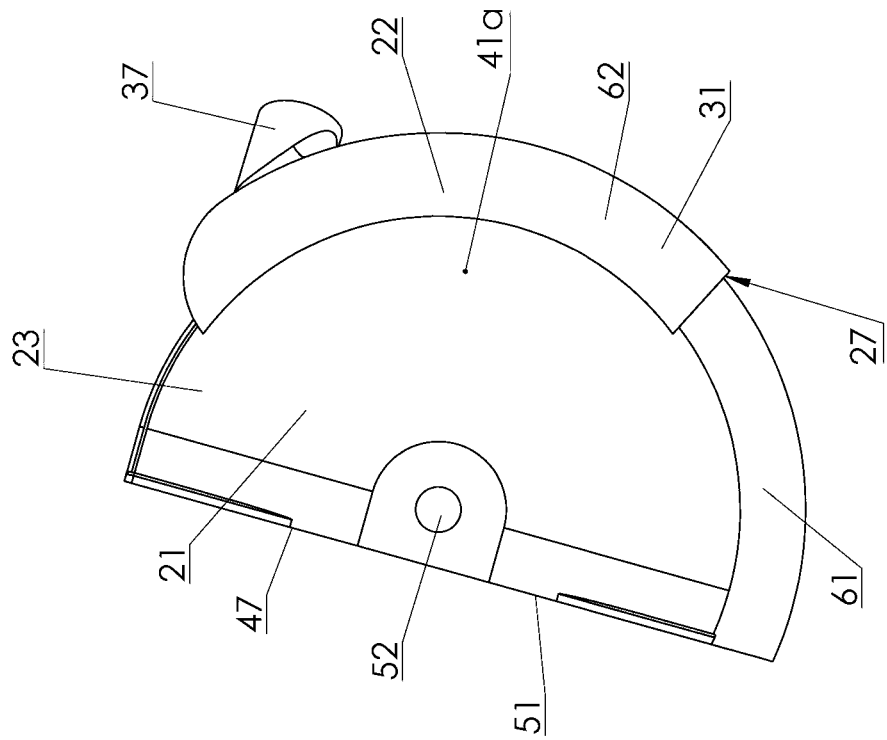
FIG. 5 is a side view of the extraction apparatus, with the shroud shown in a position corresponding generally to that of FIG. 3.
Figure 4:
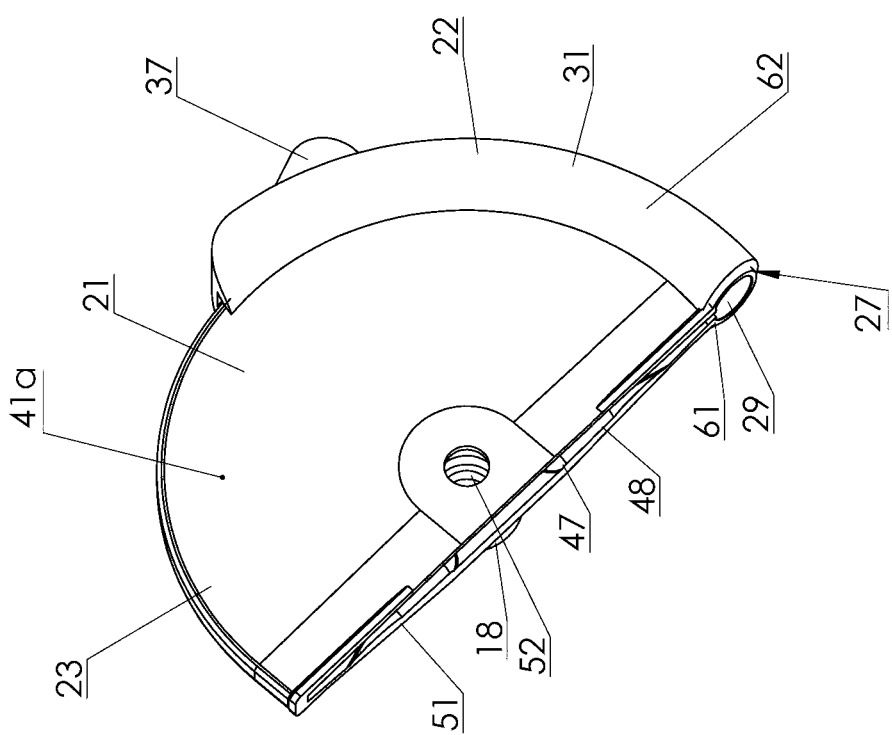
FIG. 4 is a perspective view of the extraction apparatus, with the shroud shown in a position corresponding generally to that of FIG. 2.

The shroud 23 is mounted for angular movement with respect to the second portion 22 between two opposed positions which represent the end limits of the swiveling motion. The two opposed end position are depicted schematically in FIGS. 2 and 3, with FIG. 1 depicting an intermediate position between the two end positions. The arrangement is such that the shroud 23 can assume any angular position between the two end positions, according to the orientation or angular position of the cutting machine 10.

The slidable coupling 27 comprise a first coupling section 61 and a second coupling section 62 slidable one with respect to the other to accommodates angular movement between the shroud 23 and the second portion 22.

The first coupling section 61 is provided on the shroud 23, and the second coupling section 62 is provided on the second portion 22.

The second coupling section 62 is defined by the main body 31 of the second portion 22 and is hollow to define an open interior 63. The open interior 63 is in the form of an elongate passage 64 which is open at one end 64a and closed at the other end 64b, The first coupling section 61 defines a duct 65 opening onto the interior 63 of the second coupling section 62, whereby the duct 65 and the interior 63 of the second coupling section 62 cooperate to define the fluid flow path 29 along which slurry can flow from the shroud 23 to the second portion 22 under the influence of suction. More particularly, the fluid flow path 29 is defined by the combination of the duct 65 and that portion of the interior 63 of the second coupling section 62 downstream of the outlet end 65a of the duct.

Figure 7:
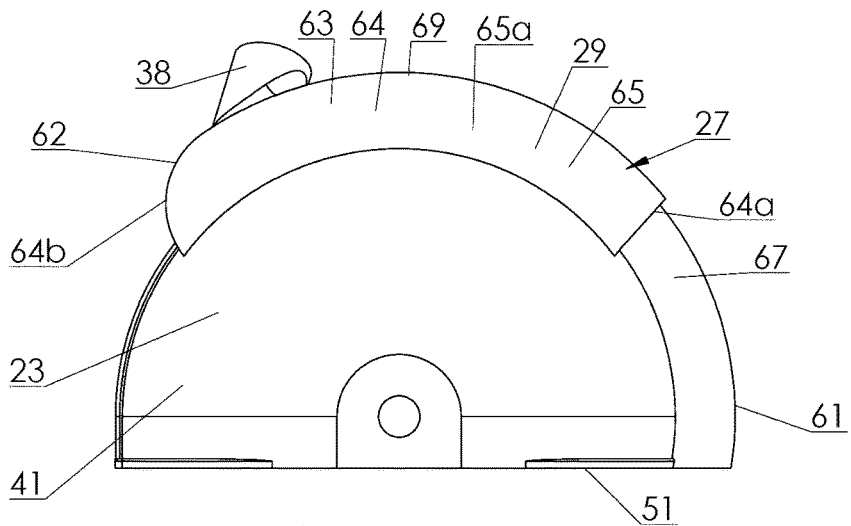
FIG. 7 is a schematic sectional side view side view of the extraction apparatus, with the shroud shown in a position corresponding generally to that of FIG. 1, illustrating in particular a slidable coupling between first and second portions of the extraction apparatus.
Figure 8:
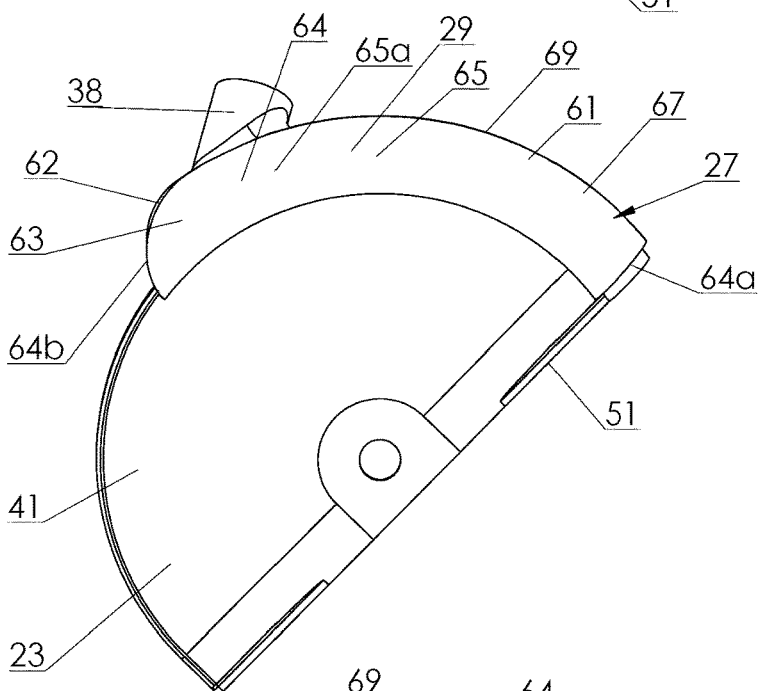
FIG. 8 is a view similar to FIG. 7, except that the shroud shown in a position corresponding generally to that of FIG. 2.
Figure 9:
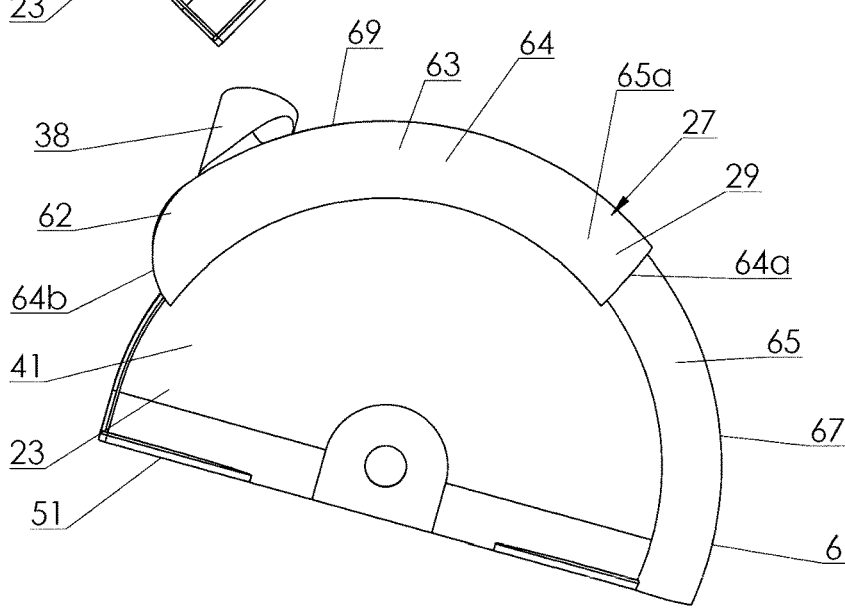
FIG. 9 is a view similar to FIG. 7, except that the shroud shown in a position corresponding generally to that of FIG. 3

In this embodiment, the first coupling section 61 is slidably received within the second coupling section 62. More particularly, the first coupling section 61 is configured as a tubular section 67 which defines the duct 65, and the second coupling section 62 is configured as a sleeve section 69 defining the elongate passage 64. With this arrangement, the tubular section 67 is slidably received in the sleeve section 69, whereby the slidable coupling 27 is operable to undergo extension and contraction in a telescopic manner, as best seen in FIGS. 7, 8 and 9. In this way, the fluid flow path 29 is of variable length, according to the extent to which the tubular section 67 is received in the sleeve section 69. The fluid flow path 29 is thus defined by the duct 65 and that portion of the elongate passage 64 in which the tubular section 67 in not received.

The first coupling section 61 and the second coupling section 63 are configured to accommodate angular movement between the shroud 23 and the second portion 22. More particularly, the first coupling section 61 and the second coupling section 63 are each curvilinear in length to accommodate angular movement between the shroud 23 and the second portion 22 while sliding one with respect to the other.

Specifically, the tubular section 67 (which provides the first coupling section 61) is provided at the curved outer periphery of the shroud 23 adjacent peripheral wall 43. The tubular section 67 is correspondingly curved such that it is curvilinear in length to accommodate angular movement with respect to the second portion 22, as previously described.

The main body 31 of the second portion 22 is of arcuate configuration and as such is curvilinear in length, as also previously described.

The tubular section 67 is disposed adjacent a portion 43a of the peripheral wall 43 of the shroud 23 on the opposed side thereof with respect to the interior 45 of the shroud 23. The duct 65 defined by the tubular section 67 is in fluid communication with the interior 45 of the shroud 23 through the intervening portion 43a of the peripheral wall 43, as will be explained in more detail later.

The sleeve section 69 is configured to accommodate angular movement of the shroud 23 as the tubular section 67 moves slidably with respect to the sleeve section 69. More particularly, in the arrangement shown, the sleeve section 69 incorporate an axial opening in the form of slot 71 for accommodating the side walls 41 of the shroud 23, thereby permitting the tubular section 67 to move slidably with respect to the sleeve section 69 upon angular movement of the shroud.

The sleeve section 69 may be formed of, or comprise at least in part, a resiliently flexible material, such as for example an appropriate pliable plastics material such a silicone, which has good heat resistance characteristics. By way of this resilient flexibility of the sleeve section 69, the longitudinal edges of the slot 71 can slidably and sealingly engage the side walls 41 of the shroud 23 to provide a sealing effect, thereby inhibiting escape of dust and slurry from the interior 45 of the shroud through the interface between the first and second portions 21, 22.

The portion 43a of the peripheral wall 43 adjacent which the first coupling section 61 is disposed, comprises a section of the shroud 23 confronted by oncoming dust and other debris generated through operation of the rotary tool element (either directly or entrained within slurry).

The interior 45 of the shroud 23 is in fluid communication with the flow path 29 by way of one or more openings 73 provided in the peripheral wall 43, as shown in FIGS. 14 to 17.

In the arrangement shown, the openings 73 comprise an aperture 75 in portion 43a of the peripheral wall 43. The aperture 75 disposed adjacent the open side 47 of the shroud 23 through which the rotatable circular blade 17 can extend. With this arrangement, fluid flow can be established to induce ambient air to flow into the interior 45 of the shroud through the opening 48 in the open side 47. The aperture 75 is contiguous with, and extends inwardly from, the opening 48 in the open end 47 of the shroud 23. In this way, suction applied to the flow path 29 (as will be described later) induces ambient air to flow into the interior 45 of the shroud through the opening 47, carrying dust and debris generated by the action of the rotating circular blade 17 into the interior of the shroud 23, and then into the duct 65 and along the flow path 29 within the sliding coupling 27. It will be recognised that much of the dust and debris generated by the action of the rotating circular blade 17 will be propelled (i.e. thrown) into the interior of the shroud 23 in any event by the rotational effect of the circular blade 17, but the suction effect likely assists the process. Furthermore, the suction effect serves to divert slurry formed within the shroud 23 (when dust and debris generated by the action of the rotating circular blade 17 is contacted dust suppression fluid (such as water) injected into the interior 45 of the shroud 23) into the flow path 29.

Also in the arrangement shown, the openings 73 further comprise a port 77 in the peripheral wall 43. The port 77 may be configured to deflect or otherwise direct dust and other debris generated through operation of the rotary tool element, as well as any associated slurry, into the flow path 29 within the sliding coupling 27. The port 77 is disposed downstream of the aperture 75. With this arrangement, fluid flow along the duct 65 from the aperture 75 can flow passed the port 77.

The port 77 is positioned to receive at least some of the dust and other debris generated through operation of the circular blade 17, as well as any associated slurry, which is not diverted through the aperture to 75. In particular, the port 77 is generally aligned with the trajectory of dust and debris which is generated by the action of the rotating circular blade 17 and which is propelled (i.e. thrown) into the interior of the shroud 23.

Figure 15:
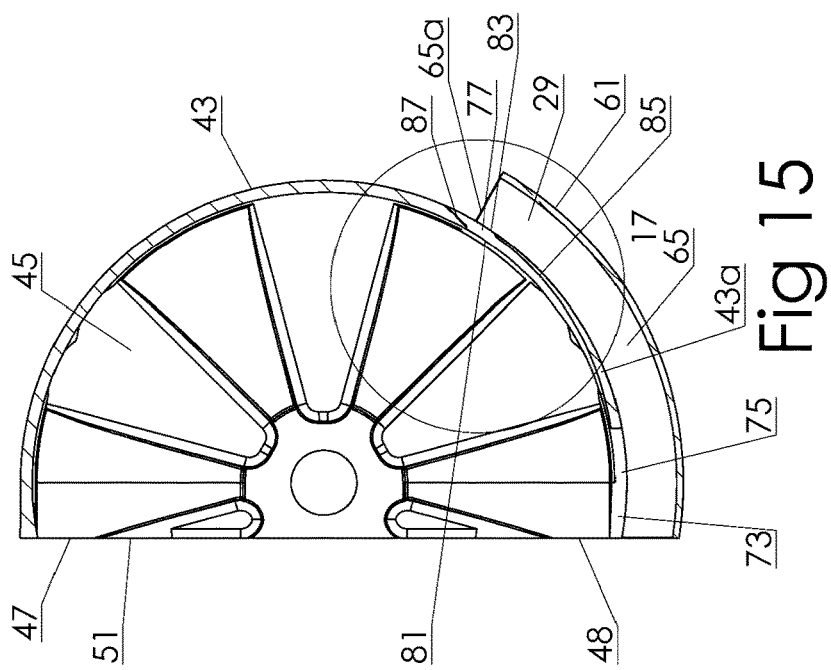
FIG. 15 is a section along line 15-15 of FIG. 14.
Figure 17:
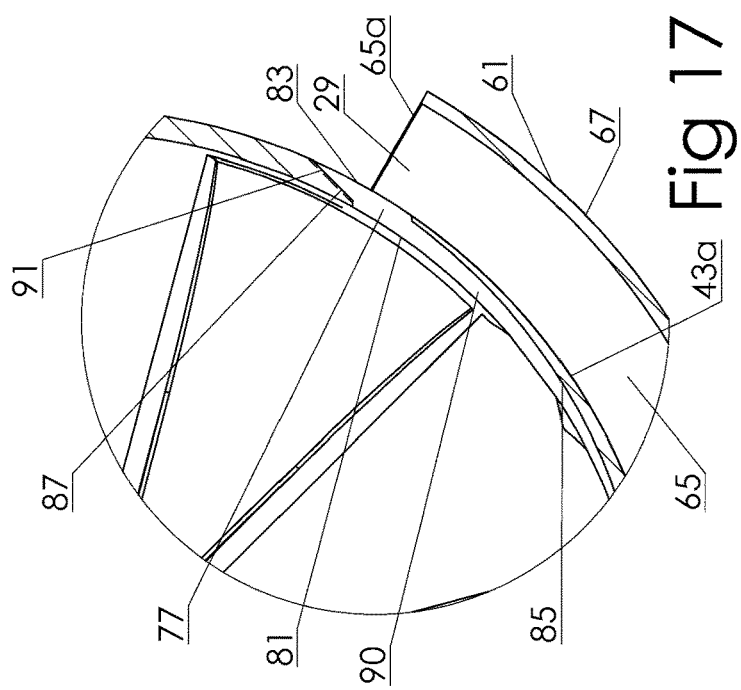
FIG. 17 is a fragmentary view on an enlarged scale of part of FIG. 10.
Figure 16:
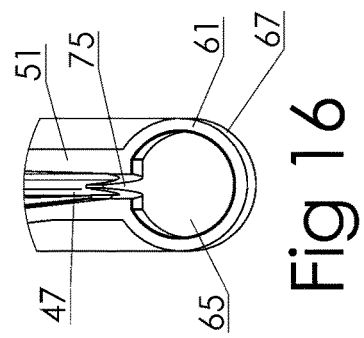
FIG. 16 is a fragmentary view on an enlarged scale of part of FIG. 9.
Figure 14:
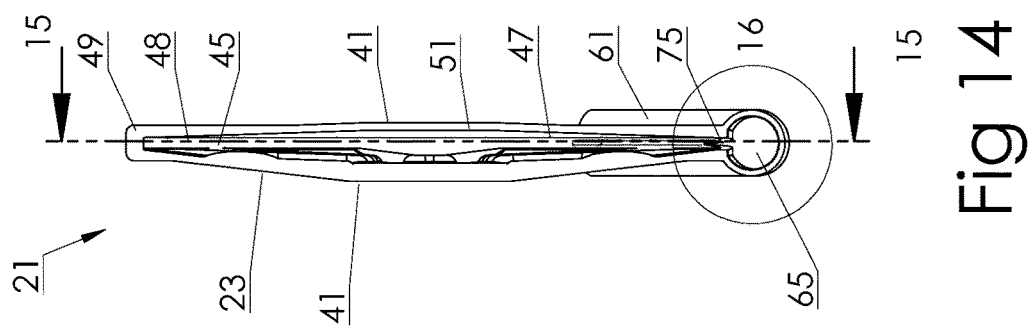
FIG. 14 is an end view of the shroud.

The port 77 has an inlet end 81 opening onto the interior 45 of the shroud 23, and an outlet end 83 opening onto the fluid path 29. In the arrangement shown, the outlet end 83 overlaps the outlet end 65a of the duct 65 defined by the tubular portion 67 (as best seen in FIG. 15 and as such can communicate directly with the open interior 63 of the sleeve section 69.

The port 77 has two opposed side walls 85, 87 extending between the inner end 81 and the outlet end 83. The two side walls 85, 87 are configured to generally conform with the trajectory of dust and debris which is generated by the action of the rotating circular blade 17 and which is propelled (i.e. thrown) into the interior of the shroud 23. For this purpose, side wall 85 (which is closer to aperture 75) is of curvilinear profile extending between the inlet end 81 and the outlet end 83 of the port. Further, opposed side wall 87 (which is remote from aperture 75) is of an inclined profile.

With this arrangement, the flow passage within the port 77 progressively contracts in cross-sectional area from the inlet end 81 to the outlet end 83 of port 77, with the inlet end 81 being considerably larger than the outlet end 83, as best seen in FIGS. 10 and 12. The larger inlet end 81 and the profile of the side wall 85 (which is closer to aperture 75), provides an extended transitional area 90 over which dust and debris, as well as associated slurry, which bypasses the aperture 75 can be diverted into the port 77 under the influence of a suction effect applied through the port.

Further, the opposed side wall 87 (which is positioned to confront oncoming dust, debris associated slurry bypassing the aperture 75, presents an angled face 91 to deflect this oncoming material into the flow path 29.

As alluded to above, an example of the manner in which the cutting machine 10, may be operated is illustrated schematically in FIG. 13. In the arrangement illustrated, a hose assembly 101 is connected to the cutting machine 10. The hose assembly 101 incorporates a suction hose (not shown) connected at one end to the connector 37 on the extraction apparatus 20 and at the other end to a vacuum source 103 such as a suction pump. The hose assembly 101 may also incorporate a water line (not shown) for delivery of water for injection into the shroud 23 as a dust suppression liquid. With this arrangement, the fluid mixture (comprising air and slurry) collected by the extraction apparatus 20 during operation of the cutting machine 10 is transported to the suction source 103, at which the collected slurry can accumulate for the later disposal and the accompanying extracted air can be discharged to atmosphere (typically after being filtered).

The operator 54 moves the cutting machine 10 along the surface 55 to perform the cutting or chasing operation. As the operator 54 progressively moves the cutting machine 10 along the surface 55, the orientation or angular position of the cutting machine varies and the shroud 23 swivels to maintain engagement with the surface 55, thereby inhibiting egress of dust and slurry.

As previously explained, dust and debris generated by the action of the rotating circular blade 17 is propelled (thrown) into the interior of the shroud 23 by the rotational effect of the circular blade 17, and also carried into the interior of the shroud under the influence of ambient air drawn into the shroud through the opening 48 in the open end 47. The dust and debris entering the shroud is contacted by injected water to create a fluid mixture comprising slurry. The slurry, along with air, is drawn into the fluid flow path 29 via aperture 75 and port 77, and flows along the fluid flow path 29 to outlet end 38 defined by connector 37, at which it enters the suction hose within the hose assembly 101 to be carried away, as previously described.

During operation of the cutting machine 10, the fluid flow path 29 established by the slidable coupling 27 is operational throughout the full range of available swiveling movement of the shroud 23, with the slidable coupling undergoing extension and contraction in a telescopic manner as previously described.

From the foregoing, it is evident that the embodiment described and illustrated provides an extraction apparatus 20 in which the second portion 22 is mounted on, or is integrated with, the cutting machine 10 and in which the first portion 21 is mounted for swiveling motion with respect to the second portion 22, as described. This may provide certain advantages. For instance, it may provide for a compact arrangement, facilitating compact packaging of the extraction apparatus 20 on the cutting machine 10. Additionally, it avoids the need for a flexible connection to the shroud by way of a separate flexible tube to accommodate the swiveling movement, as is required with the prior art arrangement discussed above. Further, with the embodiment described and illustrated, it is only necessary for the first portion 21 (comprising the shroud 23) be able to swivel, not the second portion 22. In other words, the entire assembly is not required to swivel, as is necessary for the prior art arrangement discussed above. This may offer more flexibility in terms of the construction of, and materials used for production of, the extraction apparatus 20.

In the embodiment described and illustrated, the interior 45 of the shroud 23 is in fluid communication with the flow path 29 by way of openings 73 provided in the peripheral wall 43, the openings 73 being in the form of aperture 75 and port 77. Other arrangements are, of course, contemplated. By way of example, there may be a plurality of apertures (each, for instance, somewhat similar to aperture 75) spaced at intervals along a portion of the peripheral wall 43, or a plurality of ports (each, for instance, somewhat similar to port 77) spaced at intervals along a portion of the peripheral wall 43. In another arrangement, there may be a single opening 73 configured as an elongate aperture disposed along the portion 43a of the peripheral wall 43. One end of the elongate aperture may extend to, and optionally open onto, the opening 48 in the open end 47 of the shroud 23. The other end of the elongate aperture may optionally extend to a location which would correspond generally to the position of side wall 87 of port 77 in the embodiment described and illustrated.

The foregoing disclosure is intended to explain how to fashion and use the particular embodiment described, rather than to limit the true, intended, and fair scope and spirit of the invention. The foregoing description is neither intended to be exhaustive, nor to be limited to the precise forms disclosed.

Further, it should be appreciated that various modifications can be made without departing from the principles of the invention. Therefore, the invention should be understood to include all such modifications within its scope.

The terminology used herein is for the purpose of describing particular example embodiments only and is not intended to be limiting.

As used herein, the singular forms "a", "an" and "the" may be intended to include the plural forms as well, unless the context clearly indicates otherwise.

The method steps, processes, and operations described herein are not to be construed as necessarily requiring their performance in the particular order discussed or illustrated, unless specifically identified as an order of performance. It is also to be understood that additional or alternative steps may be employed.

Reference to any positional descriptions, such as "top", "bottom" and "side", are to be taken in context of the embodiments described (and depicted in the drawings in the case of the first embodiment), and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An extraction apparatus comprising first and second portions, the first portion defining an interior for receiving a portion of a rotary tool element having an axis of rotation and having an open end defining an opening through which the rotary tool element extends and having a peripheral edge which bounds the opening and defines a contact face for engagement with and sliding movement over a surface;
   wherein said first portion is rotatable relative to the second portion for angular movement between two opposed positions whilst the first and second portions are configured to define a flow path for fluid communication during said angular movement between the two opposed positions whereby fluid can flow from the interior of the first portion into the second portion at any angular position between the two opposed positions;
   wherein said first portion is rotatable relative to the second portion about said axis of rotation of the rotary tool element for enabling said contact face to maintain engagement with the surface during said sliding movement of the contact face over the surface;
   wherein the first and second portions are configured to define a slidable coupling providing the fluid flow path, the slidable coupling being adapted to accommodate said angular movement between the first and second portions;
   wherein the slidable coupling comprises a first coupling section and a second coupling section slidable one with respect to the other, the second coupling section being hollow to define an open interior, and the first coupling section defining a duct opening onto the interior of the second coupling section, whereby the duct and the interior of the second coupling section cooperate to define the fluid flow path; and
   wherein the first coupling section is configured as a tubular section defining the duct, and the second coupling section is configured as a sleeve section, the tubular section being slidably received in the sleeve section, whereby the slidable coupling is operable to undergo extension and contraction in a telescopic manner.

2. The extraction apparatus according to claim 1 wherein the sleeve section is configured to accommodate angular movement of the first portion as the first coupling section moves slidably with respect to the second coupling section.

3. The extraction apparatus according to claim 2 wherein the sleeve section incorporates an axial opening for accommodating the first portion during angular movement thereof as the tubular section defining the first coupling section moves slidably with respect to the sleeve section.

4. The extraction apparatus according to claim 1 wherein the first coupling section and the second coupling section are configured to accommodate said angular movement between the first and second portions.

5. The extraction apparatus according to claim 1 wherein the first coupling section is provided on the first portion and the second coupling section is provided on the second portion.

6. The extraction apparatus according to claim 1 wherein the first portion comprises a peripheral wall bounding the interior of the first portion, and the first coupling section is disposed adjacent a portion of the peripheral wall on the opposed side thereof with respect to the interior, the flow path being in fluid communication with the interior of the first portion through an intervening portion of the peripheral wall.

7. The extraction apparatus according to claim 6 wherein the interior of the first portion is in fluid communication with the flow path by way of one or more openings provided in the intervening portion of the peripheral wall.

8. The extraction apparatus according to claim 7 wherein the one or more openings provided in the intervening portion of the peripheral wall comprises an aperture in the peripheral wall, the aperture being disposed adjacent an open end of the first portion through which the rotary tool element can extend.

9. The extraction apparatus according to claim 7 wherein the one or more openings provided in the peripheral wall comprise one or more ports in the peripheral wall configured to deflect or otherwise direct dust and other debris generated through operation of the rotary tool element together with any associated slurry into the flow path within the sliding coupling.

10. The extraction apparatus according to claim 1 wherein the rotary tool element extends through the opening at all angular positions of the first portion between the two opposed positions.

11. The extraction apparatus according to claim 10 wherein the open end of the first portion is an entry into the flow path at all angular positions between the two opposed positions.

12. The extraction apparatus according to claim 1 wherein the first portion is configured as a shroud disposed about a portion of the rotary tool element.

13. The extraction apparatus according to claim 1 wherein the first portion is a solitary guard piece that rotates within the second portion.

14. The extraction apparatus according to claim 1 wherein a proportion of the rotary tool element that extends through the opening is constant at all angular positions between the two opposed positions.

15. A machine for performing a working operation, the machine having an extraction apparatus according to claim 1.

16. The machine according to claim 15 comprising a work head, wherein the second portion is attached to or formed integrally with the work head and the first portion is angularly movable with respect to the second portion.

17. A method of performing a working operation, the method comprising use of a machine according to claim 15.

* * * * *